United States Patent
Schulze

(10) Patent No.: US 7,028,010 B2
(45) Date of Patent: Apr. 11, 2006

(54) METHOD FOR TRANSMITTING ENCRYPTED INFORMATION FOR REGISTERING AN APPLICATION PROGRAM

(75) Inventor: Karsten Schulze, Hallbergmoos (DE)

(73) Assignee: Siemens Aktiengesellschaft, Munich (DE)

( * ) Notice: Subject to any disclaimer, the term of this patent is extended or adjusted under 35 U.S.C. 154(b) by 580 days.

(21) Appl. No.: 09/960,885

(22) Filed: Sep. 21, 2001

(65) Prior Publication Data

US 2003/0005319 A1    Jan. 2, 2003

(30) Foreign Application Priority Data

Sep. 21, 2000    (DE) ................................ 100 46 895

(51) Int. Cl.
*H04L 9/00*    (2006.01)

(52) U.S. Cl. .......................................... 705/54; 705/51

(58) Field of Classification Search ................. 705/54, 705/55, 59, 51; 713/155, 200; 380/30; 707/203
See application file for complete search history.

(56) References Cited

U.S. PATENT DOCUMENTS

| | | | | |
|---|---|---|---|---|
| 4,458,315 A | * | 7/1984 | Uchenick | 713/200 |
| 5,222,133 A | * | 6/1993 | Chou et al. | 705/55 |
| 5,291,598 A | * | 3/1994 | Grundy | 713/200 |
| 5,343,527 A | * | 8/1994 | Moore | 380/30 |
| 5,490,216 A | * | 2/1996 | Richardson, III | 705/59 |
| 5,509,070 A | * | 4/1996 | Schull | 705/54 |
| 6,260,141 B1 | * | 7/2001 | Park | 713/155 |
| 6,377,960 B1 | * | 4/2002 | Qiu et al. | 707/203 |
| 6,460,140 B1 | * | 10/2002 | Schoch et al. | 713/200 |

FOREIGN PATENT DOCUMENTS

JP    63-244239    * 10/1988

OTHER PUBLICATIONS

"Caching in on file system locks", Schenkenberger, Digital Systems Journal, vol. 15, No. 6, p. 17(7), (Dec. 1993).*

* cited by examiner

*Primary Examiner*—Salvatore Cangialosi
(74) *Attorney, Agent, or Firm*—Bell, Boyd & Lloyd LLC

(57) ABSTRACT

A method is provided for transmitting encrypted information for registering an application program. An application program installed on a first program is control device. First application information items having at least one part-information item blocked from user access are transmitted to a second program control device. The second program control device uses coding to calculate an application value from the first application information items. The application value is transmitted to the first program control device. The first program control device uses decoding to ascertain second application information items from the application value. The first application information items and the second application information items are checked for a match when the application program starts to be executed. Prescribable functions of the application program are enabled on the basis of discrepancies resulting from the check.

20 Claims, 2 Drawing Sheets

METHOD FOR TRANSMITTING ENCRYPTED INFORMATION FOR REGISTERING AN APPLICATION PROGRAM

BACKGROUND OF THE INVENTION

In order to prevent unauthorized copying of application programs, various methods are employed for transmitting encrypted information for registering authorized copies of application programs. Such methods also serve as a technical prerequisite for selling application programs as products by means of e-commerce over computer networks. Using previously known methods for registering application programs, application programs are enabled using a registration key. The registration key is firmly associated with the application program license, and is entered either manually or is read in from a data medium to enable the program. Unfortunately, this type of procedure results in a high level of administrative complexity which requires a great deal of personnel-intensive operating and maintenance work, particularly when there are a large number of application programs installed on different program control devices.

SUMMARY OF THE INVENTION

An object of the present invention is to specify a method of transmitting encrypted information which allows automated registration of application programs installed on program control devices.

One aspect of the inventive method is that prescribable functions of an application program can be enabled for a selectable period of use by modifying a registration key pair using at least one part-information item blocked from user access. In this context, the functions in question need not to have been already available for enabling upon the initial installation of the application program. In addition, enabling the application program does not require engagement of operating and maintenance personnel at the location of the program control device on which the respective application program is installed. The components of the registration key pair are application information items and an application value. The application information items are entered on a first program control device on which the application program to be registered is installed, or are generated by the first program control device itself. The application value is calculated from the application information items by means of coding in a second program control device.

When an application program is registered or when the registration of a previously registered program is changed, first application information items having at least one part-information item blocked from user access are transmitted to the second program control device. The second program control device calculates an application value from the first application information items. The application value is then transmitted back to the first program control device. The first program control device uses decoding to ascertain second application information items from the application value. The first and second application information items are checked for a match when the application program starts to be executed. Prescribable functions of the application program are enabled on the basis of discrepancies resulting from the check.

Such a procedure is not possible using previously known methods for registering application programs. According to previously known registration methods only one registration key having part-information items fully blocked from user access is used, rather than a pair registration keys, whose components are exchanged between the first and second program control devices.

Additional features and advantages of the present invention are described in, and will be apparent from, the following Detailed Description of the Invention and the figures.

DETAILED DESCRIPTION OF THE INVENTION

Figure 1:
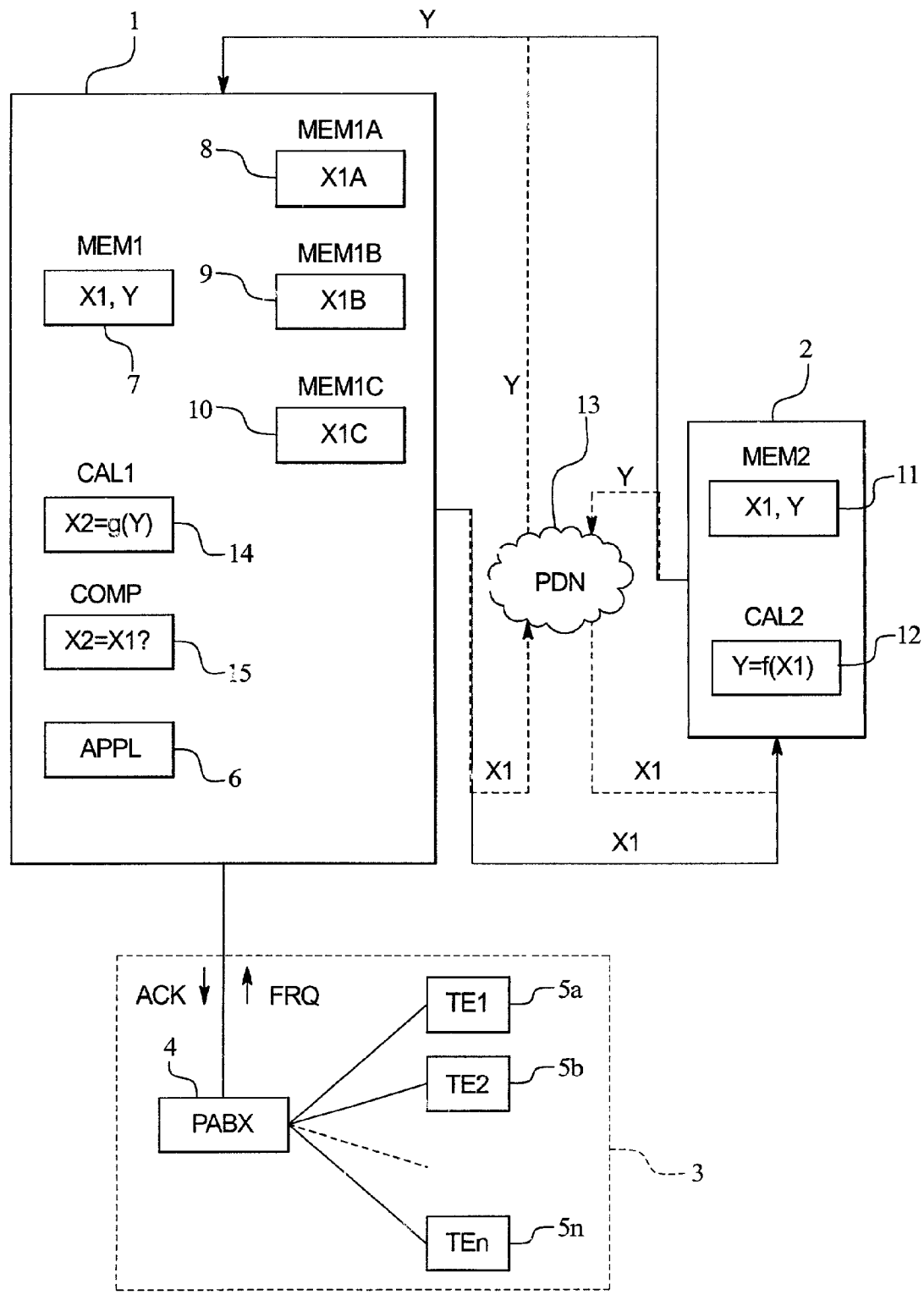
FIG. 1 is a block diagram showing a first program control device, a second program control device and a communication system connected to the first program control device.

FIG. 1 shows an arrangement having a first program control device 1, a second program control device 2 and a communication system 3. The communication system 3 has a communications installation PABX 4 and a plurality of subscriber terminals TE1 to TEn connected to the communications installation PABX 4. Installed on the first program control device 1 is an initially unregistered application program APPL 6. In this state, functions of the application program APPL 6 are enabled only to a restricted extent. The starting point for enabling further functions of the application program APPL 6 is an enable request entered by a user. In this context, first application information items X1 are captured by the first program control device APD1. This corresponds to step 1 in the flowchart shown in FIG. 2.

The first application information items X1 are stored in encrypted form distributed in a memory device MEM1 7 associated with the first program control device 1. The memory device MEM1 7 has a plurality of memory areas MEM1A 8, MEM1B 9, MEM1C 10. The memory areas MEM1A, MEM1B, MEM1C store part-information items X1A relating to program control devices, part-information items X1B relating to application programs and part-information items X1C relating to users. The information items are part of the first application information items X1. The part-information items X1A relating to program control devices are blocked from user access.

The part-information items X1A relating to program control devices include, by way of example, a processor identification marker, a network card identification marker, an IP address (Internet Protocol) for the first program control device 1 or any other hardware identification features. The combination of the hardware identification features is protected from user manipulation. Manipulating the hardware identification features results in renewed registration of the application program APPL 6. Specifically, renewed registration becomes necessary as soon as an identification feature for a hardware component of the program control device 1 changes.

The part-information items X1B relating to application programs are, by way of example, the manufacturer, the product name, the product version or functions of the application program APPL 6 which can be enabled. The part-information items X1C relating to users include, by way of example, the name, the address or a customer number, allocated by the manufacturer of the application program APPL 6, for the user.

Figure 2:
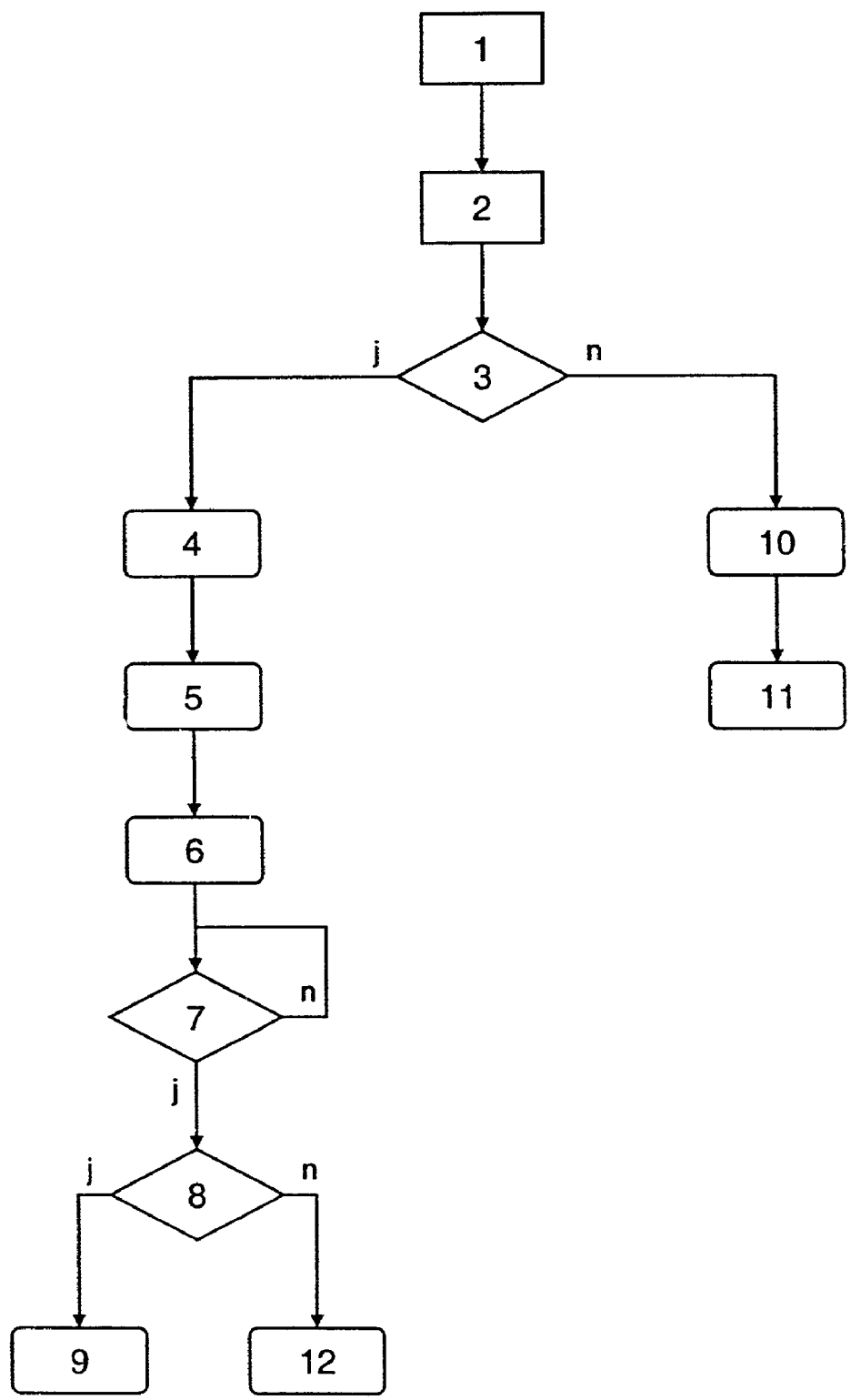
FIG. 2 is a flowchart showing a method for transmitting encrypted information for registering an application program.

In accordance with step 2 of the flowchart shown in FIG. 2, the first application information items X1 are transmitted to the second program control device 2. There, customer and order information, for example, is used to check whether the enable request is permissible (step 3). If the enable request is not permissible, a message about impermissibility of the enable request is transmitted to the first program control device 1 (step 10). In addition, if the enable request is not permissible, the first application information items X1 are reset in the program control device 1 to the state they were in before the enable request (step 11).

If the enable request is permissible, a calculation device CAL2 12 in the second program control device 2 uses coding to calculate an application value Y from the first application information items X1 (step 4). To calculate the application value Y from the first application information items X1, it is possible to use the hash function HAVAL besides the blowfish algorithm, for example. To log the calculation operation, the first application information items X1 and the application value Y are stored in a memory device MEM2 11 in the second program control device 2. The calculated application value Y is then transmitted to the first program control device 1 and is stored there in the memory device MEM1 7 (step 5).

The first application information items X1 and the application value Y are preferably transmitted via a network PDN 13 which provides connectionless services. This is indicated in FIG. 1 by the dashed connections between the first program control device 1, the second program control device 2 and the network PDN 13 providing connectionless services. The first application information items X1 and the application value Y can thus be transmitted by e-mail or by a program control element (applet), for example.

The first program control device 1 ascertains second application information items from the application value Y in a calculation device CAL1 14 in the first program control device 1 by means of decoding (step 6). Monitoring is then carried out to determine whether the application program APPL 6 starts being executed (step 7). If the application program APPL starts to be executed, the first application information items X1 and the second application information items X2 are checked in a comparator COMP 15 to determine whether they match (step 8). On the basis of the discrepancies resulting from the comparison, prescribable functions of the application program APPL are enabled (step 9) or disabled (step 12).

Enabling functions of the application program APPL 6 activates or deactivates service features in the communication system 3. For this purpose, the communications installation PABX 4 or one of the subscriber terminals TE1 to TEn 5a–5n transmits a service feature request FRQ to the first program control device 1. The first program control device 1 treats the service feature request FRQ as an enable request for selected functions of the application program APPL 6. When a service feature has been activated or deactivated, an acknowledgement message ACK is transmitted to the communications installation PABX 4.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A method for transmitting encrypted information for registering an application program installed on a first program control device, comprising the steps of:
   transmitting first application information items to a second program control device, said first application information items having at least one part-information item blocked from user access,
   calculating an application value from the first application information items using coding in the second program control device,
   transmitting the application value to the first program control device;
   ascertaining second application information items from the application value using decoding in the first program control device,
   checking the first application information items and the second application information items for a match when the application program starts to be executed, and
   enabling prescribable functions of the application program on the basis of the discrepancies resulting from the checking step.

2. The method as claimed in claim 1, further comprising the step of storing the first application information items in encrypted form distributed over a memory device associated with the first program control device.

3. The method as claimed in claim 2, further comprising the step of activating or deactivating service features available in a communication system through enabling functions of the application program.

4. The method as claimed in one of claim 3, wherein at least one of the steps of transmitting the first application information items and transmitting the application value is carried out via a network which provides connectionless services.

5. The method as claimed in claim 4, wherein at least one of the first application information items and the application value is transmitted by e-mail.

6. The method as claimed in one of claim 5, wherein at least one of the first application information items and the application value is transmitted by program control element.

7. The method as claimed in one of claim 6, wherein at least one of the first application information items comprise at least one of part-information items relating to program control devices, part-information items relating to application programs and part-information items items relating to users.

8. The method as claimed in one of claim 4, wherein at least one of the first application information items and the application value is transmitted by program control element.

9. The method as claimed in one of claim 8, wherein at least one of the first application information items comprise at least one of part-information items relating to program control devices, part-information items relating to application programs and part-information items items relating to users.

10. The method as claimed in one of claim 1, wherein at least one of the steps of transmitting the first application information items and transmitting the application value is carried out via a network which provides connectionless services.

11. The method as claimed in claim 10, wherein at least one of the first application information items and the application value is transmitted by e-mail.

12. The method as claimed in one of claim 11, wherein at least one of the first application information items and the application value is transmitted by program control element.

13. The method as claimed in one of claim 12, wherein at least one of the first application information items comprise at least one of part-information items relating to program control devices, part-information items relating to application programs and part-information items items relating to users.

14. The method as claimed in one of claim 10, wherein at least one of the first application information items and the application value is transmitted by program control element.

15. The method as claimed in claim 1, further comprising the step of activating or deactivating service features available in a communication system through enabling functions of the application program.

16. The method as claimed in one of claim 1, wherein at least one of the first application information items comprise at least one of part-information items relating to program control devices, part-information items relating to application programs and part-information items items relating to users.

17. The method as claimed in one of claim 2, wherein at least one of the first application information items comprise at least one of part-information items relating to program control devices, part-information items relating to application programs and part-information items items relating to users.

18. The method as claimed in one of claim 3, wherein at least one of the first application information items comprise at least one of part-information items relating to program control devices, part-information items relating to application programs and part-information items items relating to users.

19. The method as claimed in one of claim 4, wherein at least one of the first application information items comprise at least one of part-information items relating to program control devices, part-information items relating to application programs and part-information items items relating to users.

20. The method as claimed in one of claim 2, wherein at least one of the steps of transmitting the first application information items and transmitting the application value is carried out via a network which provides connectionless services.

* * * * *